United States Patent Office 2,980,522
Patented Apr. 18, 1961

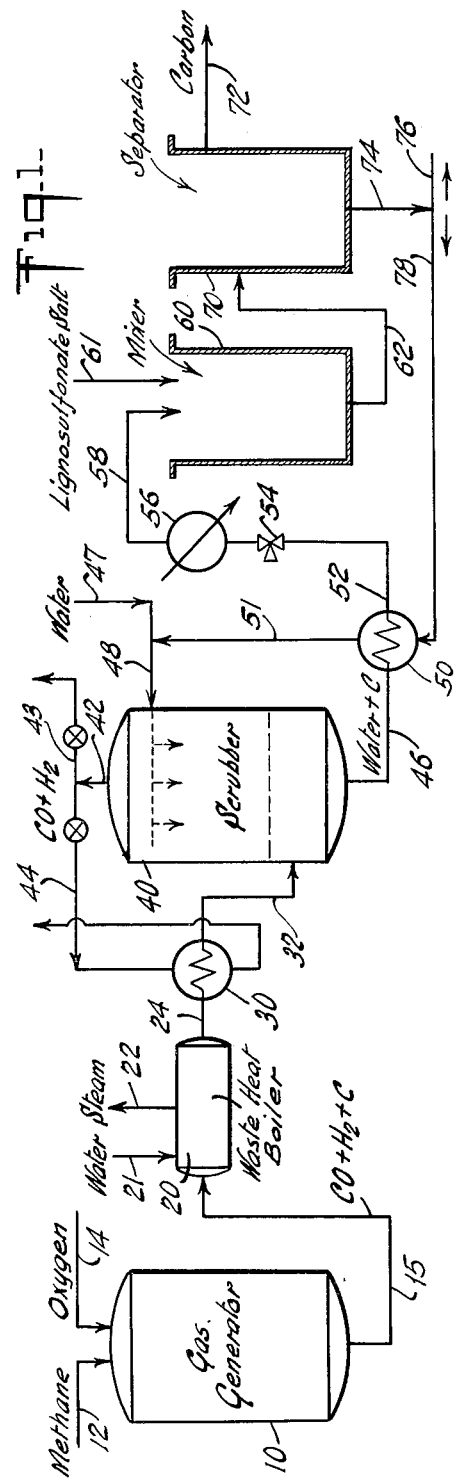
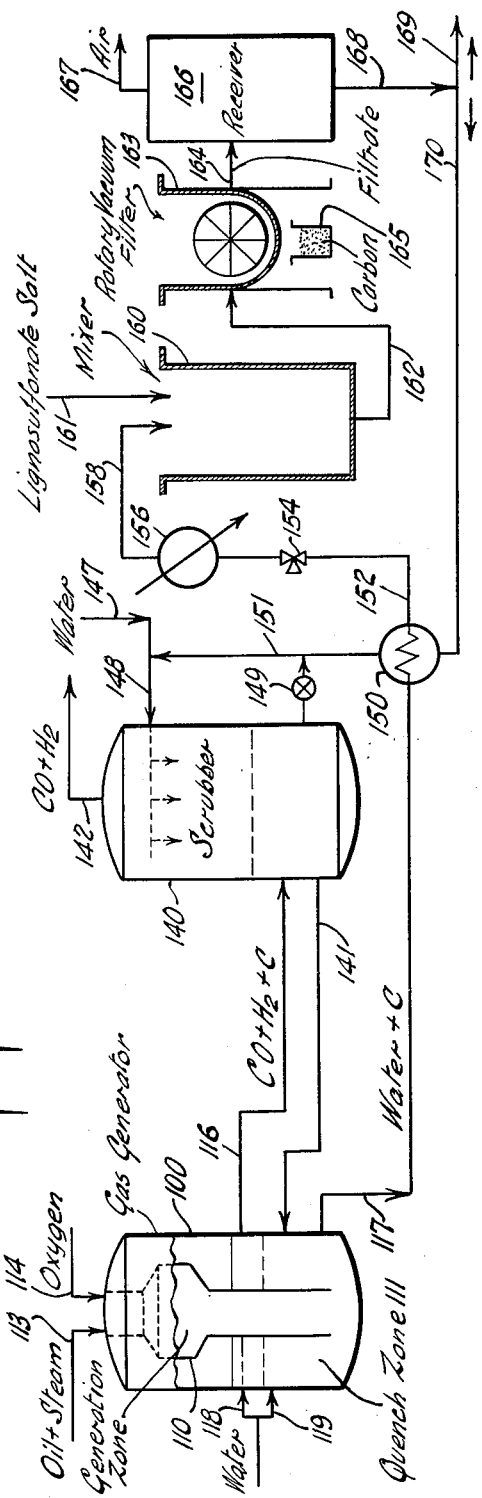

2,980,522
CARBON SEPARATION PROCESS

Roger M. Dille and Ronald W. Chapman, Whittier, Calif., assignors to Texaco Inc., a corporation of Delaware Filed Dec. 19, 1958, Ser. No. 781,788

17 Claims. (Cl. 48—196)

This invention relates to a process for the production of synthesis gas from carbonaceous fuels. More specifically, the invention is concerned with improvements in a method for the separation and recovery of free carbon particles from a carbon-water slurry formed in a synthesis gas generation process.

It is known that in the production of synthesis gas by the partial oxidation of a solid hydrocarbonaceous material there is obtained as a by-product a certain amount of finely-divided carbon in the resulting product gases, carbon monoxide and hydrogen. It is also known that the presence of these solid carbon by-products in the gaseous products obtained from a synthesis gas generator interfere with the main reactions in subsequent processes for conversion of the synthesis gas products into hydrocarbons, ammonia, and oxygenated hydrocarbons, e.g. Fisher-Tropsch type synthesis, ammonia synthesis, or methanol etc. synthesis.

Many methods have been proposed to effect separation of the free carbon particles from the synthesis gas products. These known carbon separation methods in general comprise treatment of the effluent products from the synthesis gas generator with water or water containing a low molecular weight oxygenated hydrocarbon in a scrubbing tower to effect removal of the entrained carbon particles therefrom and the removed carbon particles are then withdrawn from the scrubbing zone in the form of a carbon-water slurry. In general the carbon content of the slurry varies from about 0.1% to about 3% by weight dependent on the generator feed stocks and reaction conditions in the generator. The carbon particles are thereafter separated from the carbon-water slurry in a conventional manner such as by filtration or by evaporation. When the carbon is separated from the slurry by a filtration operation the resulting water filtrate is commonly recycled to the scrubbing tower for reuse as the scrubbing liquid by suitable piping, pumps, etc.

The carbon particles separated from the aqueous slurry are not suited for immediate use as fuel feed stock or in carbon black manufacture because of the high water content of such particles. The carbon particles recovered from the slurry in a filtration operation contain about 80 to about 90 weight percent water, the balance carbon. In order to utilize the carbon particles recovered from a filtration operation in an efficient and economical manner it is generally necessary to decrease the water content of the filter cake somewhat, particularly when the carbon is to be used as a fuel feed stock. One known method of decreasing the water content of the carbon filter cake is by an evaporation operation but this method is not completely satisfactory in large scale industrial operations due to the considerable amount of heat required and also the equipment needed for such an operation. Solvent extraction has been employed heretofore in the separation of undesirable liquids including water from materials but such methods likewise have certain objectionable features such as, solvent-handling and solvent loss which make them unattractive to industry.

We have now surprisingly found that these disadvantages can be overcome or avoided and that the water content of the separated carbon particles can be substantially decreased by the hereinafter described process of the present invention.

The present invention comprises separating the carbon particles obtained in the production of synthesis gases by the partial combustion of a carbonaceous fuel from the carbon water slurry containing a water-soluble inorganic salt of a lignosulfonic acid in a separation zone. The recovered carbon particles of reduced water content may be utilized as a fuel feed stock for a fuel-consuming operation or employed in the form of carbon black in the manufacture of rubber products without further treatment for reduction of its water content.

Water soluble alkali metal lignosulfonates or alkaline earth metal lignosulfonates such as sodium, potassium, calcium or barium lignosulfonate are suitable for use in the process of the present invention with sodium lignosulfonate being particularly preferred for the most satisfactory results. If desired, mixtures of alkali metal lignosulfonate salts or alkaline earth metal lignosulfonate salts or a blend of an alkali metal lignosulfonate salt and an alkaline earth metal lignosulfonate salt can be employed in the process of the invention as the addition agent.

A commercially available lignosulfonate salt which has been used in the process of the invention is sodium lignosulfonate sold under the trade name "Marasperse."

We have found that satisfactory results are obtained by employing the water-soluble alkali metal or alkaline earth metal lignosulfonate salt in the process of the present invention in amounts of from about 40 to about 600 weight percent, based on the weight of carbon particles present in the slurry. However, amounts of the inorganic lignosulfonate salt in the range of about 200 weight percent to about 600 weight percent, based on weight of carbon particles in the aqueous slurry are preferred for the most satisfactory results.

In carrying out the process of the invention it is desirable to provide a carbon concentration in the carbon-water slurry of from about 0.1 to about 3 percent by weight. It is preferred that the range of carbon present in the slurry be from about 0.4% to about 1.5% by weight for the most satisfactory results, with a range of from about 0.5 to about 1% being particularly preferred for optimum results.

In the process of the invention, separation of the carbon particles from the carbon-water slurry can be accomplished by filtration or by use of a centrifugal separator. In a preferred embodiment, the carbon particles are recovered from the slurry by rotary vacuum filtration operation at a pressure of about 10 pounds per square inch, absolute.

For the purpose of more fully describing the novel features of the invention and to provide for a better understanding of same, reference is had to the accompanying drawings in which:

Fig. 1 is a diagrammatic illustration of one embodiment of the process of the present invention;

Fig. 2 is a diagrammatic view of another and preferred embodiment of the present invention.

Various conventional pieces of equipment such as pumps, valves, etc. which are readily apparent to those skilled in the art have been omitted from the drawings for the sake of clarity.

Referring now to the drawings in detail and to Fig. 1, in particular, in the reaction zone of a synthesis gas generator 10 a mixture of methane and oxygen introduced therein by feed lines 12 and 14, respectively, is subjected to controlled partial combustion at elevated temperatures and superatmospheric pressures whereby hot gaseous products of partial combustion including carbon monoxide, hydrogen, and free carbon particles are produced.

The generator effluent comprising the hot gaseous combustion products CO and $H_2$ and the free carbon particles is withdrawn through line 15 from the generator 10 and passed to a waste heat boiler 20 whereby the generator effluent is cooled to a temperature not substantially above 800° F., and preferably not above about 450° F. A cooling liquid such as water is passed through line 21 to boiler 20 and by-product steam is withdrawn therefrom by line 22 for utilization as a source of heat in the system. The resulting partially cooled generator effluent is then fed through line 24, through indirect heat exchanger 30 where further cooling is effected, then passed through line 32 to a scrubbing tower 40 wherein the free carbon particles (in the generator effluent) are separated from the generator effluent gases. Carbon separation is accomplished in the tower 40 by countercurrent contacting of the generator effluent gases with an aqueous scrubbing liquid that is introduced into the upper portion of scrubber 40 through line 48. Scrubbing liquid is fed through line 47 to feed line 48 from a water source not shown. Optionally, make-up fresh water can be passed through lines 47 and 48 and mixed in line 48 with water recovered at a subsequent point in the process, i.e. from separator 70; said recovered water being passed to line 48 through feed lines 74 and 78, through a heat exchanger 50 and feed line 51. The scrubbed effluent synthesis gases are removed from scrubber 40 by way of line 42 and passed to storage facilities not shown or to a synthesis gas reaction zone through line 43, e.g. an oxide ore reduction zone, or a hydrocarbon synthesis zone. If desired, the scrubbed synthesis gases can be passed from scrubber 40 through line 42, a line 44, and through heat exchanger 30 to serve as the cooling agent therefor, before being passed to storage facilities or utilized in a synthesis gas reaction zone.

The aqueous wash liquid or slurry containing the carbon particles removed from the generator gas products is withdrawn from scrubber 40 through line 46 and passed through a heat exchanger 50 to reduce the temperature of the slurry to about 150° F., then passed through line 52 through pressure-reducing valve 54, whereby the pressure on the slurry is decreased to substantially atmospheric pressure, then passed to cooling zone 56 to further reduce the temperature of the slurry to about 70° F. to 115° F. The cooled slurry is then passed through line 58 to a mixing tank 60 wherein the carbon-water slurry is blended with a water-soluble inorganic salt of a lignosulfonic acid introduced into vessel 60 through line 61. If desired, vessel 60 can be provided with suitable mechanical mixing means, not shown, to assist in the mixing of the slurry and the lignosulfonate salt. The resulting aqueous mixture is withdrawn through line 62 from vessel 60 and passed to a separation zone 70 wherein the carbon is separated from the wash liquid by filtration or by centrifugation. The recovered carbon is withdrawn through line 72 from separation zone 70.

The substantially carbon-free aqueous liquid, which contains about 85 percent by weight of the lignosulfonate salt, is withdrawn from separation zone 70 through line 74 and may be recycled through line 78 to heat exchanger 50, serving as the cooling agent therefor, then passed through line 51 to scrubbing water feed line 48. Optionally, a portion of the filtrate can be withdrawn from line 74 and passed through line 76 to a suitable lignosulfonate recovery operation not shown, or can be discarded.

In the case when the filtrate containing a major portion of the lignosulfonate salt is recycled to the scrubbing zone 40, and the aqueous slurry of carbon particles together with the lignosulfonate salt is withdrawn from scrubber 40 through line 46 for passage to the separation zone 70, then only a sufficient amount of fresh lignosulfonate salt need be added to the slurry to maintain the concentration of the lignosulfonate in the slurry within the range of from about 40 percent to about 600 percent by weight basis carbon present in the slurry.

In addition, it is desirable in such a case to maintain the temperature within the scrubbing zone below about 350° F. for the most satisfactory results.

In a second modification of the invention, and with reference to Fig. 2 of the drawings, a preheated mixture of steam and hydrocarbon oil is reacted with oxygen obtained from feed line 114 in a reaction zone 110 which is internally disposed in the upper portion of a pressure vessel 100. The steam and oil are fed from line 113. The hot reaction products including by-product free carbon particles are passed to quench zone 111 located in the lower portion of vessel 100 and therein are contacted with a quench water stream introduced into the quench zone 111 through lines 118 and 119, respectively. Desirably a pool of water is maintained in quench zone 111 to aid in rapid cooling of the generation zone effluent. In quench zone 111, the hot products of combustion are partially cooled by water introduced therein by feed lines 118 and 119, respectively, and at least partial separation of carbon particles from the product gases is effected in the quench zone by entrainment with water.

The partially cooled gaseous reaction products including at least part of the by-products free carbon particles are withdrawn from quench zone 111 through line 116 and passed therethrough to a scrubbing zone 140 for further removal of the free carbon particles from the main gaseous products of the generation zone by the scrubbing action of an aqueous wash liquid introduced into tower 140 through feed line 148. The aqueous liquid, obtained from an external source not shown, is fed to scrubber 140 through line 147 and line 148. A portion of the wash liquid water can also be furnished to tower feed line 148 through line 151, the water being obtained from receiver 166 and passed to line 151 through lines 168, 170 and heat exchanger 150.

The scrubbed gases substantially free of carbon particles are removed from the scrubber 140 by way of line 142 for further processing. The pool of scrubbing liquid accumulated in the lower portion of scrubber 140 containing the carbon particles scrubbed from the generation zone product gases, may be recycled through line 149 and line 151 to the feed line 148 at the upper portion of scrubber 140 when it is desired to increase the concentration of the carbon particles in the wash liquid before final withdrawal of the carbon-water slurry from scrubber 140. The scrubbing water accumulated in the lower portion of the tower and containing the carbon particles removed from the gas stream in scrubber 140 is passed through line 141 to quench zone 111 to effect further cooling of the generator effluent introduced into the quench zone and also to remove at least a part of the carbon particles from the fresh synthesis gas products being introduced into zone 111 from generation zone 110. The resulting concentrated slurry of carbon in water is passed through line 117 from quench zone 111 to heat exchanger 150 to effect a reduction of the temperature of the carbon-water slurry to about 120° to 200° F., preferably about 150° F. then passed through line 152 through pressure-reducing valve 154 whereby the pressure of the slurry is decreased to about atmospheric pressure, but not above about 20 p.s.i.g. and then passed to a cooling zone 156 to further reduce the temperature of the slurry to a temperature between about 70° F. to 125° F. The resulting cooled slurry is then passed through line 158 to a mixing vessel or tank 160 wherein the slurry is intimately mixed with a water-soluble inorganic metal lignosulfonate salt fed to vessel 160 through line 161. The resulting mixture is passed by way of line 162 to a separation zone 163 which is provided with a rotary vacuum filter for removal of the water from the carbon particles. The separated carbon particles having a reduced water content are collected in the form of a filter cake in a suitable container or vessel 165.

The water filtrate from the separation zone 163 containing at least a portion of the lignosulfonate salt in solution therein is passed from the filter 163 through line 164 to a receiver 166 for removal of entrapped air through line 167. The filtrate is then withdrawn from the receiver by way of line 168. The filtrate in line 168 can be discarded by passage through line 169 or it may be fed through line 170 to heat exchanger 150 to serve as the cooling agent therefor. The filtrate is then passed by way of line 151 to feed line 148 which supplies scrubbing liquid to scrubbing tower 140. Optionally, a portion of the filtrate in line 168 which has been withdrawn from receiver 166 can be discarded through line 169 and the remaining portion can be passed to heat exchanger 150 through line 170.

EXAMPLE 1

A carbon-water slurry containing 1% by weight of by-product carbon particles produced in a synthesis gas generation zone was blended with a water-soluble sodium lignosulfonate. Sufficient of the lignosulfonate was used so that the resulting slurry contained 15.9 weight percent of the lignosulfonate, basis carbon in the slurry.

The resulting mixture was subjected to mechanical agitation to ensure thorough mixing of the slurry and the sodium lignosulfonate, then the mixture was filtered using a rotary vacuum filter under reduced pressure to separate the carbon particles from the mixture. The filtrate contained about 86 weight percent of sodium lignosulfonate based on weight of sodium lignosulfonate initially added.

The carbon content of the resulting filter cake was determined and is reported in the table below. The water content of the filter cake is also shown in the table, this value being obtained by difference (i.e. 100% less wt. percent carbon equals percent water content).

The table further shows the carbon content of a filter cake obtained in a process similar to the one described in Example 1, except that no lignosulfonate salt was used in this run. The table shows the concentration of the carbon particles in the slurry in both runs and the amount of the additive used in Example 1.

EXAMPLES 2-18

Following the procedure of Example 1 additional runs were made wherein varying amounts of a sodium lignosulfonate were blended with the carbon-water slurry obtained in a synthesis gas generation process. The carbon content of the slurry was also varied in some of these runs. In each example, the method employed in recovering the carbon particles from the slurry-additive agent mixture was the same as the method used in Example 1.

The table shows the amount of carbon present in the slurry in each of these examples, together with the amount of the sodium lignosulfonate agent used as well as the results of analysis of the carbon content of the separated filter cake.

Table

| Example | Weight Percent of Carbon in Slurry | Addition agent in slurry Weight Percent Basis Carbon | Carbon Content of filter cake (wt. percent) | Water Content of filter cake (wt. percent by difference) |
|---|---|---|---|---|
| Control "A" | 1.0 | none | 10.9 | 89.1 |
| 1 | 1.0 | 15.9 | 18.4 | 81.6 |
| 2 | 1.0 | 26.4 | 14.4 | 85.6 |
| 3 | 1.0 | 53.0 | 42.5 | 57.5 |
| 4 | 1.0 | 132.0 | 25.0 | 75.0 |
| 5 | 0.5 | 20 | 15.2 | 84.8 |
| 6 | 0.5 | 40 | 19.7 | 80.3 |
| 7 | 0.5 | 60 | 19.0 | 81.0 |
| 8 | 0.5 | 80 | 17.1 | 82.9 |
| 9 | 0.5 | 100 | 17.6 | 82.4 |
| 10 | 0.5 | 200 | 24.6 | 75.4 |
| 11 | 0.5 | 300 | 26.4 | 73.6 |
| 12 | 0.5 | 400 | 43.2 | 56.8 |
| 13 | 0.5 | 500 | 30.6 | 69.4 |
| 14 | 0.5 | 600 | 27.8 | 72.2 |
| Control "B" | 0.5 | none | 15.0 | 85.0 |
| 15 | 0.5 | 0.5 | 15.2 | 84.8 |
| 16 | 0.5 | 3.0 | 14.1 | 85.9 |
| 17 | 0.5 | [1] 0.5 | 14.8 | 85.2 |
| 18 | 0.5 | [2] 3.0 | 16.0 | 84.0 |

[1] +0.2 wt. percent caustic, basis weight of carbon in slurry.
[2] +0.4 wt. percent caustic, basis weight of carbon in slurry.

The effectiveness of the inorganic salt of a lignosulfonic acid to reduce the water content of carbon particles recovered from the carbon-water slurry is clearly shown in the foregoing table of data. In the table, the data of Examples 3 and 4 show there is a material reduction in the water-content of the filter cake obtained from the carbon water slurry containing 1 weight percent carbon when the slurry contains an amount of the water-soluble lignosulfonate salt of about 53 weight percent or more, basis carbon. Examples 9 to 14 inclusive indicate the beneficial effects with respect to increased amounts of the addition agent for slurries containing 0.5 weight percent carbon. Examples 1, 2, 5, 6, 15 and 16 demonstrate that the use of minor amounts of addition agent have little or no significant effect on reducing the water content of the filter cake obtained from an aqueous slurry of 0.5% carbon particles. Examples 17 and 18 demonstrate that the use of caustic in addition to small amounts of the lignosulfonate salt does not appreciably change the water content of the separated carbon particles.

Obviously, many modifications and variations of the process of the invention can be made without departing from the spirit and scope thereof and therefore only such limitations should be imposed as are expressly indicated in the foregoing description and appended claims.

We claim:

1. In a process for the generation of a synthesis gas mixture by partial oxidation of a hydrocarbonaceous material at an elevated temperature and pressure in which the generated gas mixture comprising carbon monoxide and hydrogen contains minor amounts of solid carbon particles produced by said partial oxidation process, and the generated gas mixture is contacted in a scrubbing zone with an aqueous liquid to effect removal of said carbon particles from the mixture with the resulting formation of an aqueous slurry of said carbon particles, the improvement which comprises incorporating a water-soluble inorganic salt of a lignosulfonic acid in the aqueous slurry in an amount of at least about 40% by weight, basis weight of free carbon present, said amount being sufficient to decrease the water content of the separated carbon particles, and thereafter separating carbon particles of reduced water content from the slurry.

2. Process as claimed in claim 1, in which separation of the carbon particles from the aqueous carbon slurry containing the water-soluble inorganic salt of lignosulfonic acid is carried out by filtration under vacuum.

3. Process as claimed in claim 1, in which the slurry contains from about 0.1% to about 1.5% by weight of carbon particles.

4. Process as claimed in claim 1, in which the slurry contains from about 0.5% to about 1.0% by weight of carbon particles.

5. Process as claimed in claim 1, in which the inorganic salt is sodium lignosulfonate.

6. Process as claimed in claim 1, in which the inorganic salt is employed in an amount of from about 200 percent to about 600 percent, based on the weight of carbon particles present in the slurry.

7. Process as claimed in claim 1, in which sodium lignosulfonate is employed in an amount of from about 200 percent to about 500 weight percent, based on the weight of carbon present in the slurry.

8. Method of decreasing the water content of carbon particles separated from a carbon-water slurry obtained in a partial oxidation process for the conversion of a hydrocarbonaceous material into a synthesis gas mixture comprising carbon monoxide and hydrogen which also contains free carbon particles which are removed therefrom by scrubbing the gas mixture with water with the resultant formation of said carbon-water slurry, said method comprising introducing into the slurry a water-soluble inorganic salt of a lignosulfonic acid in an amount of at least 40 weight percent based on the weight of free carbon present in the slurry and thereafter separating carbon particles from the slurry.

9. In a partial oxidation process for the production of synthesis gas from a hydrocarbonaceous material wherein the resulting synthesis gas mixture comprising carbon monoxide and hydrogen is scrubbed with water to remove therefrom solid carbon particle by-products with the resultant formation of a carbon-water slurry, the improvement which comprises incorporating a water-soluble inorganic salt of a lignosulfonic acid in said slurry, said salt being employed in an amount of from about 100 percent to about 500 percent by weight, based on weight of carbon present in the slurry, and subsequently filtering the resulting slurry to recover carbon particles of reduced water content.

10. In a conversion process in which a carbonaceous material is partially oxidized in a reaction zone under superatmospheric pressure in the presence of oxygen and steam to produce a hot gaseous product containing free carbon particles and the hot gaseous product is contacted with water in a scrubbing zone to remove the carbon particles and form a carbon-water slurry, the improvement which comprises passing the carbon-water slurry through a first cooling zone wherein the temperature of the slurry is decreased, passing the resulting cooled slurry through a pressure-reducing zone wherein the pressure on the slurry is lowered, passing the resulting slurry through another cooling zone wherein the temperature of the slurry is further decreased, passing the resulting slurry to a mixing zone wherein a water-soluble inorganic salt of a lignosulfonic acid in an amount of at least about 40% by weight, basis weight of free carbon present, is blended with the slurry, and thereafter passing the blended mixture to a separation zone wherein free carbon particles of reduced water content are recovered by filtration at a pressure less than atmospheric pressure.

11. In a process for the production of carbon monoxide from a carbonaceous fuel wherein said fuel is reacted with oxygen in a reaction zone under superatmospheric pressure and a high temperature to produce a hot gaseous product containing particles of free carbon and said gaseous product is contacted with water in a contacting zone to remove said carbon particles therefrom and form a dispersion of the carbon particles in water and said carbon particles are recovered therefrom by mechanical separation, the improvement which comprises contacting the gaseous products of combustion with water containing a water-soluble inorganic salt of a lignosulfonic acid in an amount of at least about 40% by weight, basis weight of free carbon present, and thereafter recovering carbon particles of reduced water content from said dispersion by mechanical separation.

12. Process of claim 11 in which prior to said mechanical separation the dispersion is intimately commingled in a quench zone with an additional portion of the hot gaseous products from the reaction zone to effect concentration of the carbon particles in said dispersion, said concentrated dispersion is subjected to temperature reduction, the resulting cooled dispersion is subjected to pressure reduction to substantially atmospheric pressure, and thereafter the resulting dispersion is subjected to said mechanical separation.

13. Process as claimed in claim 11 in which mechanical separation is carried out by filtration at a pressure less than atmospheric pressure.

14. Process as claimed in claim 11 in which separation is carried out by centrifugation.

15. Process as claimed in claim 11, in which the inorganic salt is sodium lignosulfonate.

16. Process as claimed in claim 11 in which the inoragnic salt is employed in an amount of from about 200 percent to about 600 percent, based on the weight of carbon particles present in the dispersion.

17. Process as claimed in claim 11 in which the hot gaseous product is contacted in the quench zone with water containing a substantial portion of said inorganic salt of lignosulfonic acid, said water being obtained from said mechanical separation.

References Cited in the file of this patent

UNITED STATES PATENTS

| | | |
|---|---|---|
| 2,665,980 | Carkeek | Jan. 12, 1954 |
| 2,746,564 | Williams | May 22, 1956 |
| 2,793,938 | Frank | May 28, 1957 |
| 2,894,603 | Vasan | July 14, 1959 |